No. 657,675. Patented Sept. 11, 1900.
G. F. QUINBY.
SPIRIT LEVEL AND PLUMB.
(Application filed Mar. 8, 1900.)
(No Model.)
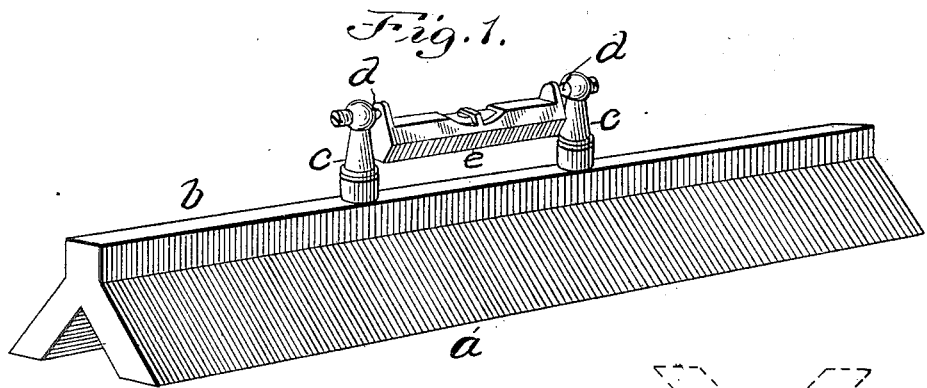
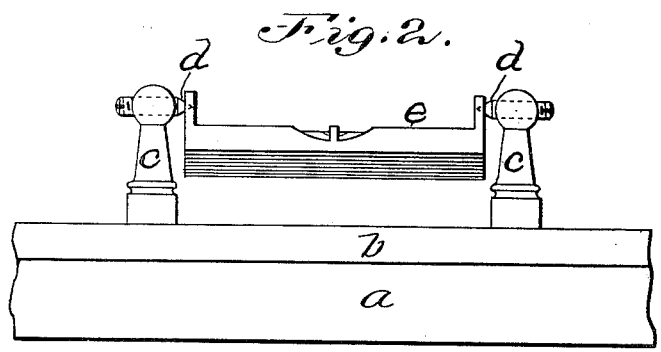
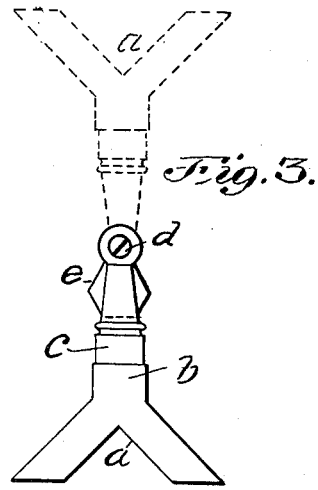
WITNESSES:
Rollin Abell
Annie J. Dailey.
INVENTOR:
Geo. F. Quinby.
by Crosley & Davis
Attys.

UNITED STATES PATENT OFFICE.

GEORGE F. QUINBY, OF BOSTON, MASSACHUSETTS.

SPIRIT-LEVEL AND PLUMB.

SPECIFICATION forming part of Letters Patent No. 657,675, dated September 11, 1900.

Application filed March 8, 1900. Serial No. 7,761. (No model.)

*To all whom it may concern:*

Be it known that I, GEORGE F. QUINBY, of Boston, in the county of Suffolk and State of Massachusetts, have invented certain new and useful Improvements in Spirit-Levels and Plumbs, of which the following is a description sufficiently full, clear, and exact to enable those skilled in the art to which it appertains or with which it is most nearly connected to make and use the same.

This invention has relation to leveling or plumbing instruments generally, and particularly to that class of such instruments wherein a spirit-level is employed to ascertain levels or inclinations, the object of the invention being to so mount a spirit-level upon a support forming part of the instrument that when such support is placed against the work the spirit level or bottle will assume an upright position or a position with its sight side uppermost, where it may be readily seen.

In carrying out the invention it is proposed to hang the level cradle-like in a certain longitudinal relation to its support, so that however the latter may be placed upon the work, whether against the top, bottom, or side of the same, the spirit-level may by its own gravity swing to upright position—*i. e.*, to position where its sight side is uppermost, it being well known that the bottle of a spirit-level is generally visible on but one side of its casing.

Reference is to be had to the annexed drawings, and to the letters marked thereon, forming a part of this specification, the same letters designating the same parts or features, as the case may be, wherever they occur.

Of the drawings, Figure 1 is a perspective view showing the invention as applied to a bar on the apex or top of an angular base. Fig. 2 is a side view with the base broken off to economize space on the drawings. Fig. 3 is an end view showing by means of dotted lines a changed relation of parts. Fig. 4 shows in elevation an instrument capable of employment both as a level and plumb, the ends of the base or support being broken off for economy of space on the drawings.

In the drawings, Figs. 1 to 3, inclusive, $a$ designates the base, which is angular in cross-section and comprises sides standing at right angles to each other with bottom edges in the same plane and a bar $b$, formed integral with said sides and extending along the top or apex of the base. Erected on this bar are two upright standards $c\ c$, between which on pin-point bearings $d\ d$ the spirit-level proper, $e$, is hung by means of two ears springing from the ends of the case which holds the spirit-bottle and which has the usual sight-opening on the side from which said ears extend. With this construction, suppose it was proposed to level a shaft by placing the angular sides of the base $a$ against the shaft, below it, or on its sides. The level will in each case assume an upright position, and the user will have sufficient room and opportunity to examine the level and the position of the bubble therein.

It will be understood from an inspection of the drawings and from the description thus far given that the spirit-level proper is brought to and maintained in a level position by its own gravity, and this is an essential feature of the invention, whatever may be the form of the base or frame or however the spirit-level may be pivoted on its support.

In Fig. 4 I have shown my improvement in an oblong frame or bar, and exhibit the latter as provided with a plumb $p$, constructed and arranged in substantially the same way as the spirit-level. This is but to show the forms and arrangements that may be made in the connections and use of the invention without departing from the nature or spirit of the improvements. In this last-mentioned figure the spirit-level proper $e$ is hung on pin-pivots in the same way and for the same purpose as in the other figures.

In Fig. 3 I have shown by dotted lines how the spirit-level support may be inverted while the spirit-level proper maintains its upright position by swinging on its pivots, as described. It is not thought necessary to go into further details concerning the manner of using the device.

Numerous variations can of course be made in the form of the support or base, as also in the form of means for mounting the spirit-level thereon, without involving a departure from the scope of the invention so long as the base or support is adapted for application to the work and the spirit-level is mounted thereon so as to maintain a certain longitudinal relation thereto and by its own gravity remain right side up.

Having thus fully described my invention, what I claim as new, and desire to secure by Letters Patent of the United States, is—

1. An instrument of the character described comprising a suitable support for application to the work, and a spirit-level pivotally mounted on said support with its axis lengthwise of the spirit-level, the latter maintaining its longitudinal relation to the support with the right side uppermost.

2. An instrument of the character described comprising a suitable support for application to the work, and a spirit-level pivoted at its ends to said support and free to swing on an axis lengthwise of the spirit-level, the latter maintaining its longitudinal relation to the support, substantially as described.

3. An instrument of the character described comprising a suitable support for application to the work, said support having confronting and alining bearings; and a spirit-level engaged at its ends with said bearings and free to swing on an axis extending lengthwise of the spirit-level, the latter maintaining its longitudinal relation to the support, substantially as described.

In testimony whereof I have signed my name to this specification, in the presence of two subscribing witnesses, this 6th day of March, A. D. 1900.

GEORGE F. QUINBY.

Witnesses:
ARTHUR W. CROSSLEY,
ANNIE J. DAILEY.

Corrections in Letters Patent No. 657,675.

It is hereby certified that in Letters Patent No. 657,675, granted September 11, 1900, upon the application of George F. Quinby, of Boston, Massachusetts, for an improvement in "Spirit-Levels and Plumbs," errors appear in the printed specification requiring correction, as follows: On page 1, line 63, after the word "shaft" a comma should be inserted; line 65, same page, the period after the word "sides" should be stricken out and a comma inserted, and the following word "the" should begin with a small "t," thus making a continuous sentence; and page 2, line 14, the word "right" should read *sight;* and that the said Letters Patent should be read with these corrections therein that the same may conform to the record of the case in the Patent Office.

Signed, countersigned, and sealed this 25th day of September, A. D., 1900.

[SEAL.]

F. L. CAMPBELL,
*Assistant Secretary of the Interior.*

Countersigned:
 WALTER H. CHAMBERLIN,
  *Acting Commissioner of Patents.*